US011337262B2

United States Patent
Brown et al.

(10) Patent No.: US 11,337,262 B2
(45) Date of Patent: May 17, 2022

(54) PREDICTIVE BEARERS IN A WIRELESS COMMUNICATION NETWORK

(71) Applicant: British Telecommunications Public Limited Company, London (GB)

(72) Inventors: Ruth Brown, London (GB); Jonathan Hart, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 15/733,669

(22) PCT Filed: Mar. 27, 2019

(86) PCT No.: PCT/EP2019/057808
§ 371 (c)(1),
(2) Date: Sep. 26, 2020

(87) PCT Pub. No.: WO2019/185766
PCT Pub. Date: Oct. 3, 2019

(65) Prior Publication Data
US 2021/0029758 A1    Jan. 28, 2021

(30) Foreign Application Priority Data
Mar. 28, 2018 (EP) .................................... 18164587

(51) Int. Cl.
*H04W 76/12* (2018.01)
*H04W 76/15* (2018.01)
*H04W 76/11* (2018.01)

(52) U.S. Cl.
CPC ............ *H04W 76/12* (2018.02); *H04W 76/11* (2018.02); *H04W 76/15* (2018.02)

(58) Field of Classification Search
CPC ...... H04W 76/11; H04W 72/12; H04W 76/15
See application file for complete search history.

(56) References Cited

U.S. PATENT DOCUMENTS 8,358,624 B1    1/2013   Ghaus et al.
8,811,594 B1 *  8/2014   Ganzhorn ........... H04M 3/5183
                                          379/265.09
(Continued)

FOREIGN PATENT DOCUMENTS

CN         1849805 A    10/2006
CN       101390419 A     3/2009
(Continued)

OTHER PUBLICATIONS

3GPP, "3rd Generation Partnership Project; Technical Specification Group Services and System Aspects; General Packet Radio Services (GPRS) enhancements for Evolved Universal Terrestrial Radio Access Network (E-UTRAN) access (Release 15)," 3GPP Standard, Technical Specification; 3GPP TS 23.401, vol. SA WG2, No. V15.3.0, Mar. 27, 2018, XP051450523, pp. 1-405.
(Continued)

*Primary Examiner* — Zhensheng Zhang
(74) *Attorney, Agent, or Firm* — Patterson Thuente IP

(57) ABSTRACT

A method of establishing bearers for a device in a wireless communication network, including collecting for the device data over a period of time from communication sessions the device participates in, at least some of the communication sessions being supported by a default bearer and a dedicated bearer; calculating from the collected data a likelihood a dedicated bearer will be established for the device at one or more different times values, and predicting the dedicated bearer will be established for the device at a time value if the likelihood of establishment at that time value exceeds a specified threshold; and initiating establishment of the dedicated bearer to establish the dedicated bearer for the predicted time value.

10 Claims, 12 Drawing Sheets

(56) References Cited

U.S. PATENT DOCUMENTS

| | | | |
|---|---|---|---|
| 9,210,691 | B2 | 12/2015 | Ponukumati et al. |
| 9,883,436 | B2 | 1/2018 | Brown et al. |
| 10,123,241 | B2 | 11/2018 | Brown et al. |
| 2002/0187780 | A1 | 12/2002 | Souissi |
| 2003/0069018 | A1 | 4/2003 | Matta et al. |
| 2005/0048972 | A1 | 3/2005 | Dorenbosch et al. |
| 2006/0126595 | A1 | 6/2006 | Dahm et al. |
| 2007/0026861 | A1 | 2/2007 | Kuhn et al. |
| 2007/0057843 | A1 | 3/2007 | Chang et al. |
| 2007/0064576 | A1 | 3/2007 | Ogata |
| 2007/0064676 | A1 | 3/2007 | Peisa et al. |
| 2008/0034296 | A1* | 2/2008 | Bybee ............... G06Q 30/02 715/741 |
| 2008/0112364 | A1 | 5/2008 | Kwon et al. |
| 2008/0293394 | A1 | 11/2008 | Silver et al. |
| 2009/0156219 | A1 | 6/2009 | Kim et al. |
| 2010/0003994 | A1 | 1/2010 | Akiyama |
| 2010/0291924 | A1 | 11/2010 | Antrim et al. |
| 2011/0026485 | A1 | 2/2011 | Lin et al. |
| 2011/0201336 | A1 | 8/2011 | Garrett et al. |
| 2011/0217979 | A1 | 9/2011 | Nas |
| 2011/0281582 | A1 | 11/2011 | Jiang |
| 2012/0021744 | A1 | 1/2012 | Chin et al. |
| 2012/0069750 | A1 | 3/2012 | Xing et al. |
| 2012/0122515 | A1 | 5/2012 | Han et al. |
| 2012/0144226 | A1 | 6/2012 | Yang et al. |
| 2012/0208548 | A1* | 8/2012 | Park ............... H04W 72/00 455/452.2 |
| 2013/0223230 | A1 | 8/2013 | Swaminathan et al. |
| 2013/0237245 | A1 | 9/2013 | Tinnakornsrisuphap et al. |
| 2013/0252660 | A1 | 9/2013 | Bach |
| 2013/0267229 | A1 | 10/2013 | Gopalakrishnan |
| 2013/0303240 | A1 | 11/2013 | Sanka et al. |
| 2013/0337811 | A1 | 12/2013 | Faerber et al. |
| 2014/0066069 | A1 | 3/2014 | Salami et al. |
| 2014/0086159 | A1 | 3/2014 | Sajadieh et al. |
| 2014/0114568 | A1 | 4/2014 | Park |
| 2014/0126406 | A1 | 5/2014 | Ibanez et al. |
| 2014/0162676 | A1 | 6/2014 | Shaw |
| 2014/0187243 | A1 | 7/2014 | Rune et al. |
| 2014/0233449 | A1 | 8/2014 | Laroia et al. |
| 2014/0341184 | A1 | 11/2014 | Dhanda et al. |
| 2014/0378129 | A1 | 12/2014 | Jiang et al. |
| 2015/0036504 | A1 | 2/2015 | McMurry et al. |
| 2015/0085663 | A1 | 3/2015 | McMurry et al. |
| 2015/0097731 | A1 | 4/2015 | Russell |
| 2015/0139015 | A1 | 5/2015 | Kadous et al. |
| 2015/0296364 | A1 | 10/2015 | Peruru et al. |
| 2015/0334604 | A1 | 11/2015 | Banks et al. |
| 2016/0021660 | A1 | 1/2016 | Krishnamurthy |
| 2016/0029281 | A1 | 1/2016 | Zhou et al. |
| 2016/0095036 | A1 | 3/2016 | Stojanovski et al. |
| 2016/0183281 | A1 | 6/2016 | Yeh et al. |
| 2016/0205605 | A1 | 7/2016 | Krishnamurthy |
| 2016/0262200 | A1 | 9/2016 | Su |
| 2016/0295439 | A1 | 10/2016 | Yang et al. |
| 2017/0094628 | A1 | 3/2017 | Miao et al. |
| 2017/0127217 | A1 | 5/2017 | Miao et al. |
| 2017/0230255 | A1 | 8/2017 | Joung et al. |
| 2017/0311210 | A1* | 10/2017 | Draznin ............ H04W 36/0022 |
| 2017/0332301 | A1 | 11/2017 | Horn et al. |
| 2017/0347298 | A1 | 11/2017 | Brown et al. |
| 2018/0262922 | A1 | 9/2018 | Mackenzie et al. |
| 2019/0028983 | A1 | 1/2019 | Mackenzie et al. |
| 2019/0239101 | A1 | 8/2019 | Ouyang et al. |
| 2020/0045559 | A1 | 2/2020 | Kim et al. |
| 2020/0288296 | A1 | 9/2020 | Fiorese et al. |

FOREIGN PATENT DOCUMENTS

| | | | |
|---|---|---|---|
| CN | 101656994 | A | 2/2010 |
| CN | 101931891 | A | 12/2010 |
| CN | 102164375 | A | 8/2011 |
| CN | 102387590 | A | 3/2012 |
| CN | 103002005 | B * | 2/2018 ............. G06F 11/30 |
| EP | 2434816 | A2 | 3/2012 |
| EP | 2857798 | A1 | 4/2015 |
| EP | 2750444 | A4 | 5/2015 |
| EP | 2991242 | A1 | 3/2016 |
| GB | 2559556 | A | 8/2018 |
| GB | 2559731 | A | 8/2018 |
| GB | 2560754 | A | 9/2018 |
| GB | 2560899 | A | 10/2018 |
| GB | 2572394 | A | 10/2019 |
| JP | 2993087 | B2 | 12/1999 |
| JP | 2001209891 | A | 8/2001 |
| JP | 2012009948 | A | 1/2012 |
| KR | 20100131025 | A | 12/2010 |
| WO | WO-9951052 | A1 | 10/1999 |
| WO | WO-2007097670 | A1 | 8/2007 |
| WO | WO-2009043283 | A1 | 4/2009 |
| WO | WO-2009121833 | A1 | 10/2009 |
| WO | WO-2010133256 | A1 | 11/2010 |
| WO | WO-2011033173 | A1 | 3/2011 |
| WO | WO-2011095687 | A1 | 8/2011 |
| WO | WO-2014021761 | A2 | 2/2014 |
| WO | WO-2015177601 | A1 | 11/2015 |
| WO | WO-2015180126 | A1 | 12/2015 |
| WO | WO-2016172839 | A1 | 11/2016 |
| WO | WO-2017006157 | A1 | 1/2017 |
| WO | WO-2018145796 | A1 | 8/2018 |
| WO | WO-2018145797 | A1 | 8/2018 |
| WO | WO-2018172002 | A1 | 9/2018 |
| WO | WO-2018172003 | A1 | 9/2018 |
| WO | WO-2019185800 | A1 | 10/2019 |

OTHER PUBLICATIONS

International Search Report and Written Opinion for Application No. PCT/EP2019/057808, dated May 31, 2019, 14 pages.

3GPP TS 23.122, Generation Partnership Project; Technical Specification Group Core Network and Terminals; Non-Access-Stratum (NAS) functions related to Mobile Station (MS) in idle mode, 3rd Generation Partnership Project (3GPP), Mobile Competence Centre; 650, Route Des Lucioles; F-06921 Sophia-Antipolis Cedex; France, vol. CT WG1, No. V12.9.0, Jun. 24, 2016, XP051295206, (Release 12), 1 page.

3GPP TS 23.401 V15.3.0, "3rd Generation Partnership Project; Technical Specification Group Services and System Aspects; General Packet Radio Service (GPRS) enhancements for Evolved Universal Terrestrial Radio Access Network," (E-UTRAN) access (Release 15), Mar. 2018, 405 pages.

3rd Generation Partnership Project; Technical Specification Group Radio Access Network; Evolved Universal terrestrial Radio Access (E-UTRA) and Evolved Universal Terrestrial Radio Access Network (E-UTRAN); Radio interface protocol aspects (Release 7), Oct. 17, 2006, XP050909974, 1 page.

Chandra K., et al., "CogCell: Cognitive Interplay between 60 GHz Picocells and 2.4/5 GHz Hotspots in the 5G Era," IEEE Communications Magazine, May 7, 2015, 14 pages.

Christodoulou C. G., et al., "Reconfigurable Antennas for Wireless and Space Applications," Proceedings of the IEEE, Jul. 2012, vol. 100, No. 7, pp. 2250-2261.

Combined Search and Examination Report under Section 17 and 18(3) for Application No. 1702030.6, dated Jul. 7, 2017, 2 pages.

Combined Search and Examination Report under Sections 17 & 18(3) for Great Britain Application No. 1704702.8, dated Aug. 14, 2017, 2 pages.

Corrected Search Report under Section 17 for Great Britain Application No. GB1702033.0, dated Jun. 29, 2017, 2 pages.

European Search Report for Application No. EP13250127, dated May 20, 2014, 2 pages. (Search Report only).

Examination Report under Section 18(3) for Great Britain Application No. 1805321.5, dated Jul. 29, 2020, 3 pages.

Examination Report under Section 18(3) for Great Britain Application No. GB1805078.1, dated Aug. 5, 2020, 3 pages.

Examination Report under section 18(3) for Application No. 1702030.6, dated May 3, 2019, 2 pages.

(56) References Cited

OTHER PUBLICATIONS

Examination Report under Section 18(3) for Great Britain Application No. 1704702.8, dated Oct. 22, 2019, 4 pages.
Examination Report Under Section 18(3) for Great Britain Application No. GB1704702.8, dated Jun. 17, 2019, 2 pages.
Extended European Search Report for Application No. 17155116.1, dated Jul. 6, 2017, 8 pages.
Extended European Search Report for Application No. 17155118.7, dated Aug. 29, 2017, 7 pages.
Extended European Search Report for Application No. 17162851.4, dated Sep. 5, 2017, 13 pages.
Extended European Search Report for Application No. 17162854.8, dated Aug. 31, 2017, 18 pages.
First Office Action dated Jan. 19, 2017 for Chinese Application No. 201480068013.0 filed Nov. 19, 2014, 10 pages (including Translation).
Great Britain Combined Search and Examination Report under Sections 17 & 18 (3) for Application No. GB1702033.0, dated Nov. 29, 2017, 1 page.
Great Britain Combined Search and Examination Report Under Sections 17 & 18(3) for Application No. GB1704694.7, dated Aug. 14, 2017, 2 pages.
Great Britain Examination Report under Section 18(3) for Application No. GB1704694.7, dated Jun. 5, 2019, 1 page.
Great Britain Search Report Under Section 17 for Application No. GB1704694.7, dated Aug. 11, 2017, 2 pages.
International Search Report and Written Opinion for Application No. PCT/EP2019/057807, dated May 31, 2019, 15 pages.
International Search Report for Application No. PCT/EP2019/057864, dated May 24, 2019, 3 pages.
International Preliminary Report on Patentability for Application No. PCT/EP2017/082585, dated Aug. 22, 2019, 10 pages.
International Preliminary Report on Patentability for Application No. PCT/EP2017/082586, dated Aug. 22, 2019, 7 pages.
International Preliminary Report on Patentability for Application No. PCT/EP2018/054134, dated Oct. 3, 2019, 20 pages.
International Preliminary Report on Patentability for Application No. PCT/EP2018/054135, dated Oct. 3, 2019, 11 pages.
International Preliminary Report on Patentability for Application No. PCT/GB2014/053426, dated Nov. 13, 2015, 11 pages.
International Search Report and Written Opinion for Application No. PCT/EP2017/082585, dated Apr. 9, 2018, 11 pages.
International Search Report and Written Opinion for Application No. PCT/EP2017/082586, dated Feb. 9, 2018, 9 pages.
International Search Report and Written Opinion for Application No. PCT/EP2018/054134, dated Apr. 5, 2018, 23 pages.
International Search Report and Written Opinion for Application No. PCT/EP2018/054135, dated Apr. 26, 2018, 12 pages.
International Search Report for Application No. PCT/GB2014/053426, dated Feb. 20, 2015, 4 pages.
Legg, P., et al., "Load Balancing and Aggregation Algorithms for LTE Dual Connectivity," 2016 IEEE 83rd Vehicular Technology Conference (VTC Spring), May 15, 2016, 5 pages.
Office Action for Chinese Application No. 201980021858.7, dated Jan. 27, 2021, 11 pages.
Office Action for Chinese Application No. 201980021917.0, dated Jan. 25, 2021, 19 pages.
Search Report dated Jan. 9, 2017 for Chinese Application No. 201480068013.0 filed Nov. 19, 2014, 4 pages.
Search Report under Section 17 for Great Britain Application No. GB1702033.0, dated Jun. 29, 2017, 1 page.
Search Report under Section 17 for Great Britain Application No. 1702030.6, dated Jul. 6, 2017, 1 page.
Search Report Under Section 17 for Great Britain Application No. GB1704702.8, dated Aug. 10, 2017, 2 pages.
Tunon D., et al., "Adding Dimensions to Wireless Systems with Orientation-Aware Devices and Reconfigurable Antennas," International Conference on Computing, Networking and Communications, Invited Position Papers, 2014, pp. 298-302.
Viprinet: Bonding LTE / 4G via LTE routers—better than Load Balancing | LTE /4G, "LTE—We Combine the Latest Mobile Phone Generation!," Jul. 1, 2019, retrived from https://www.viprinet.com/en/technology/combinable-media/lte-4g, 4 pages.
Yang Z., et al., "Sensor-assisted Codebook-based Beamforming for Mobility Management in 60 GHz WLANs," IEEE 12th International Conference on Mobile Ad Hoc and Sensor Systems, 2015, pp. 333-341.
Application and File History for U.S. Appl. No. 15/733,668, filed Sep. 26, 2020, Inventor: Brown et al.

* cited by examiner

PREDICTIVE BEARERS IN A WIRELESS COMMUNICATION NETWORK

PRIORITY CLAIM

The present application is a National Phase entry of PCT Application No. PCT/EP2019/057808, filed Mar. 27, 2019, which claims priority from EP Patent Application No. 18164587.0, filed Mar. 28, 2018, each of which is hereby fully incorporated herein by reference.

FIELD

This disclosure relates to techniques for establishing bearers within a wireless communication network based on predictive techniques.

BACKGROUND

In wireless communication networks, bearers can be used to identify traffic flows (e.g. IP packet flows) between nodes of the network that have a common quality of service (QoS) requirement. That is, a bearer is an IP packet flow with a defined QoS between two nodes of a network. A bearer may be viewed as a virtual connection between two nodes of the network.

An example of a communication network that uses bearers is the Long Term Evolution (LTE) network. FIG. 1 schematically illustrates the bearers for an LTE network.

An LTE network typically includes a device (e.g. a user equipment (UE)) 102; a base station 104 (referred to as an eNodeB); a serving gateway (SGW) 106; and a packet data network (PDN) gateway (PGW) 108. The SGW 106 and the PGW form part of the evolved packet core (EPC). The EPC core may contain additional components not shown in FIG. 1 for the purposes of clarity. The LTE network connects the device 102 to an external packet data network (PDN) 110.

Evolved Packet System (EPS) bearers 112 are a virtual connection between the UE 102 and the PGW 108. The EPS bearer identifies data (e.g. IP packets) communicated between these two endpoints (i.e. data sent from the UE 102 to the PGW 108 and data sent from the PGW 108 to the UE 102) with specific QoS attributes/requirements. In other words, the EPS bearer uniquely identifies traffic flows (e.g. data packets) that have a common QoS requirement between the UE 102 and the PGW 108. The EPS bearer is a bearer of the LTE network; that is, it connects two endpoints, or nodes (the UE 102 and PGW 108) that are within the LTE network. External bearer 114 is a virtual connection between the PGW 108 of the LTE network and the external packet data network 110.

The EPS bearer provides the PDN connectivity service to the UE 102. EPS bearers are typically created on a per-PDN basis; that is, a set of EPS bearers will be established for each PDN the UE 102 is connected to. This is illustrated schematically in FIG. 2.

In the example shown in FIG. 2, the UE 102 is connected to two packet data networks 202 and 204. Network 202 is shown as an IP Multimedia Subsystem (IMS) network for delivering IP multimedia data. Network 204 is shown as the internet. It will be appreciated that these examples have been chosen for the purposes of illustration only.

A first set of EPS bearers 206 provide a virtual connection between the UE 102 and the first PDN 202; and a second set of EPS bearers 208 provide a virtual connection between the UE 102 and the second PDN 204.

In some instances, the UE 102 may communicate multiple different types of data over the network, each with its own QoS requirements. For example, the UE 102 may be running multiple applications at a given time, each having different QoS requirements. To provide some examples, the UE 102 may be concurrently communicating VoIP data and web-browsing data. Typically, VoIP data has higher QoS requirements than web-browsing data in some aspects (e.g. lower acceptable delay times), but lower QoS requirements in other aspects (e.g. packet loss rate). To support the communication of data having different QoS requirements, different EPS bearer types can be set up, each associated with different type of QoS.

EPS bearers can be broadly classified into two types: default bearers (e.g. 2061 and 2081) and dedicated bearers (e.g. 2062,3 and 2082). Default bearers are established when a UE attaches to the network, and remain established for the duration of the UE's PDN connection. Dedicated bearers may be established at any time subsequent to the establishment of the default bearer. Dedicated bearers may be established to support communication sessions with specific QoS requirements. Dedicated bearers may be of different types, each associated with a respective QoS.

Referring back to FIG. 1, it can be seen that EPS bearers cross multiple communication interfaces of the network. That is, the EPS bearers cross multiple nodes of the network. Between a given pair of nodes, the EPS bearer maps onto a lower layer bearer. In particular, the EPS bearer maps to an E-UTRAN Radio Access Bearer (E-RAB) bearer 116 between the UE 102 and SGW 106. In other words, the E-RAB bearer 116 has two endpoints, the UE 102 and the SGW 106. The EPS bearer also maps to an S5/S8 bearer 118 between the SGW 106 and the PGW 108 (i.e., the endpoints of the S5/S8 bearer are the SGW 106 and the PGW 108).

Thus, the EPS bearer 112 consists of the E-RAB bearer and the S5/S8 bearer. The EPS bearer may be referred to as the concatenation of the E-RAB bearer and the S5/S8 bearer.

The E-RAB bearer 116 connects the UE 102 to the SGW 106 (more specifically, it connects the UE 102 to the eNodeB 104, and the eNodeB 104 to the SGW 106). The E-RAB transports the data packets of the EPS bearer between the UE 102 and the SGW 106.

The S5/S8 bearer connects the SGW 106 to the PGW 108, and transports the data packets of the EPS bearer between the SGW 106 and the PGW 108.

The E-RAB bearer maps to a radio bearer 120 and S1 bearer 122 between the UE 102 and SGW 106. In more detail, the E-RAB bearer maps to the radio bearer 120 between the UE 102 and eNodeB 104, and to the S1 bearer between the eNodeB 104 and SGW 106. Thus, the E-RAB bearer consists of the radio bearer 120 and S1 bearer 122. It may be referred to as the concatenation of the radio bearer 120 and the S1 bearer 122. The radio bearer transports the data packets of the E-RAB bearer between the UE 102 and the eNodeB 104, and the S1 bearer transports the data packets of the E-RAB bearer between the eNodeB 104 and the SGW 106.

There is typically a delay in establishing bearers for a communication session. For example, dedicated bearers are not established until after a default bearer has been established, resulting in a potential delay and non-guaranteed QoS until the dedicated bearer is established. Other bearers (such as the E-RAB or radio bearers) may be particularly susceptible to congestion, meaning there can also be a delay in trying to establish these bearers when initiating a communication session. These delays may be undesirable for a user of the UE, and in some cases may negatively impact the performance of the UE, particularly in cases when the UE is running time-sensitive applications, such as gaming, or remote diagnostics.

SUMMARY

According to one aspect of the present disclosure there is provided a method of establishing bearers for a device in a wireless communication network, comprising: collecting for the device data over a period of time from communication sessions the device participates in, at least some of the communication sessions being supported by a default bearer and a dedicated bearer; calculating from the collected data a likelihood a dedicated bearer will be established for the device at one or more different times values, and predicting the dedicated bearer will be established for the device at a time value if the likelihood of establishment at that time value exceeds a specified threshold; and initiating establishment of the dedicated bearer to establish the dedicated bearer for the predicted time value.

The method may further comprise receiving at a node of the network a request to modify session information, the request including an identification flag indicating data from communication sessions the device participates in is to be collected for the device, wherein data for the device is collected at the module following receipt of the identification flag.

The node may be a policy and charging rules function (PCRF) node.

The collected data may comprise timing data indicating time values the dedicated bearer is established for the device.

The collected data may further comprise location data indicating a network cell of the communication network the dedicated bearer is established in for the device.

The calculating may comprise calculating: (i) a likelihood the dedicated bearer will be established for the device at one or more different time values and (ii) the network cell the dedicated bearer will be established in for the device.

The initiating may comprise initiating establishment of the dedicated bearer: (i) to establish the dedicated bearer for the predicted time; and (ii) within the network cell the dedicated bearer is predicted to be established in at the predicted time value.

The method may further comprise initiating deactivation of the dedicated bearer if it is determined the device has not used the dedicated bearer within a specified time period of the establishment of the dedicated bearer.

The dedicated bearer may be an EPS bearer.

According to another aspect of the present disclosure there is provided an apparatus for establishing bearers for a device within a wireless communication network, comprising: a data store configured to collect for the device data over a period of time from communication sessions the device participates in, at least some of the communication sessions being supported by a default bearer and a dedicated bearer; a computation module configured to calculate from the collected data a likelihood a dedicated bearer will be established for the device at one or more different times values, and predict the dedicated bearer will be established for the device at a time value if the likelihood of establishment at that time value exceeds a specified threshold; and a communications module configured to initiate establishment of the dedicated bearer to establish the dedicated bearer for the predicted time value.

BRIEF DESCRIPTION OF FIGURES

The present disclosure will now be described by way of example with reference to the accompanying drawings. In the drawings.

DETAILED DESCRIPTION

The present disclosure is directed to approaches for establishing bearers within a wireless communication network using predictive techniques. The bearers can be established within the network for a device on the basis of predictions made from data collected from communication sessions the device participates in. The predictions estimate the likelihood, or probability, for one or more different times that the device will use the bearer as part of a communication session at that time. If an estimated likelihood that a bearer will be established at a particular time exceeds a specified threshold, establishment of that bearer is initiated so that the bearer is established at that time. By establishing a bearer based on a predicted likelihood of use, the bearer can be established and ready for use for the time it is needed by the device. This may reduce the delay associated within establishing certain types of bearers within the network.

Two general classes of examples for establishing bearers will be described herein. The first set of examples relate to establishing a first bearer that transports data packets of a second bearer between nodes, or components of the network. In these examples, the second bearer comprises the first bearer; in other words, the second bearer is the concatenation of the first bearer and some other third bearer. Put another way, the second bearer is a higher layer bearer than the first bearer/the first bearer is a lower layer bearer than the second bearer. The first bearer could for example be an E-RAB bearer, or a radio bearer. The second bearer could be an EPS bearer (if the first bearer is an E-RAB bearer), or the second bearer may be an E-RAB bearer (if the first bearer is a radio bearer).

The second set of examples relate to establishing a dedicated bearer.

These examples will now be described in more detail with reference to FIGS. 3 to 12. These examples will describe the establishment of bearers in the context of an LTE network. It will be appreciated that this is for the purposes of illustration only, and that the following techniques and approaches can be applied within different types of wireless communication networks that implement bearers.

Figure 3:
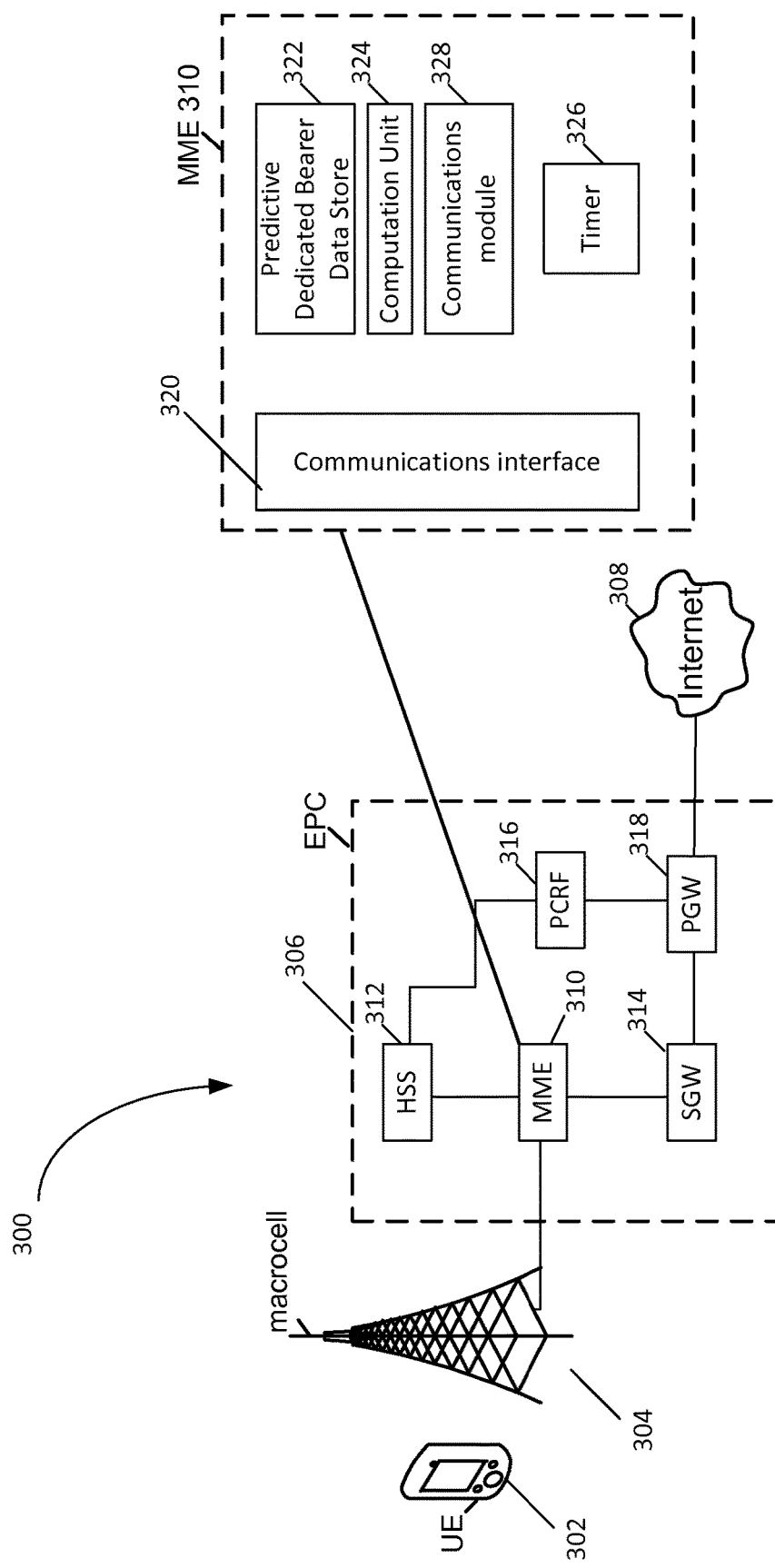
FIG. 3 shows an example of an LTE network in accordance with an embodiment of the present disclosure.

FIG. 3 shows an example of an LTE network 300. The network comprises a user equipment (UE) 302, an eNodeB 304, and an evolved network core (EPC) 306. The EPC connects to an external packet data network 308, which in the example illustrated here is the internet.

The UE may be any suitable type of device capable of participating in wireless communications. The UE could be, for example, a mobile phone, smartphone, laptop, PC, tablet, etc.

Figure 1:
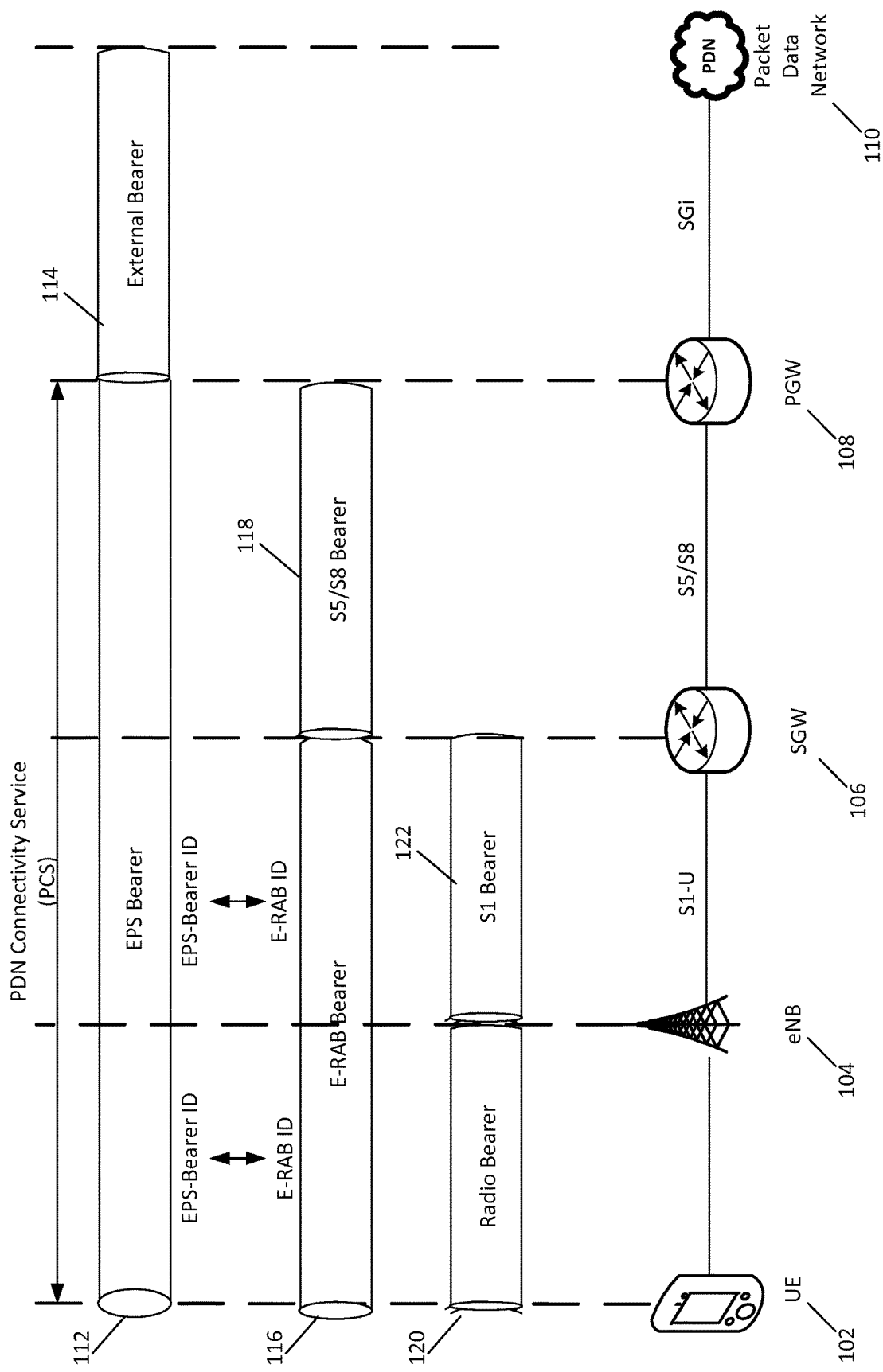
FIG. 1 shows a schematic illustration of bearers within an LTE network.
Figure 2:
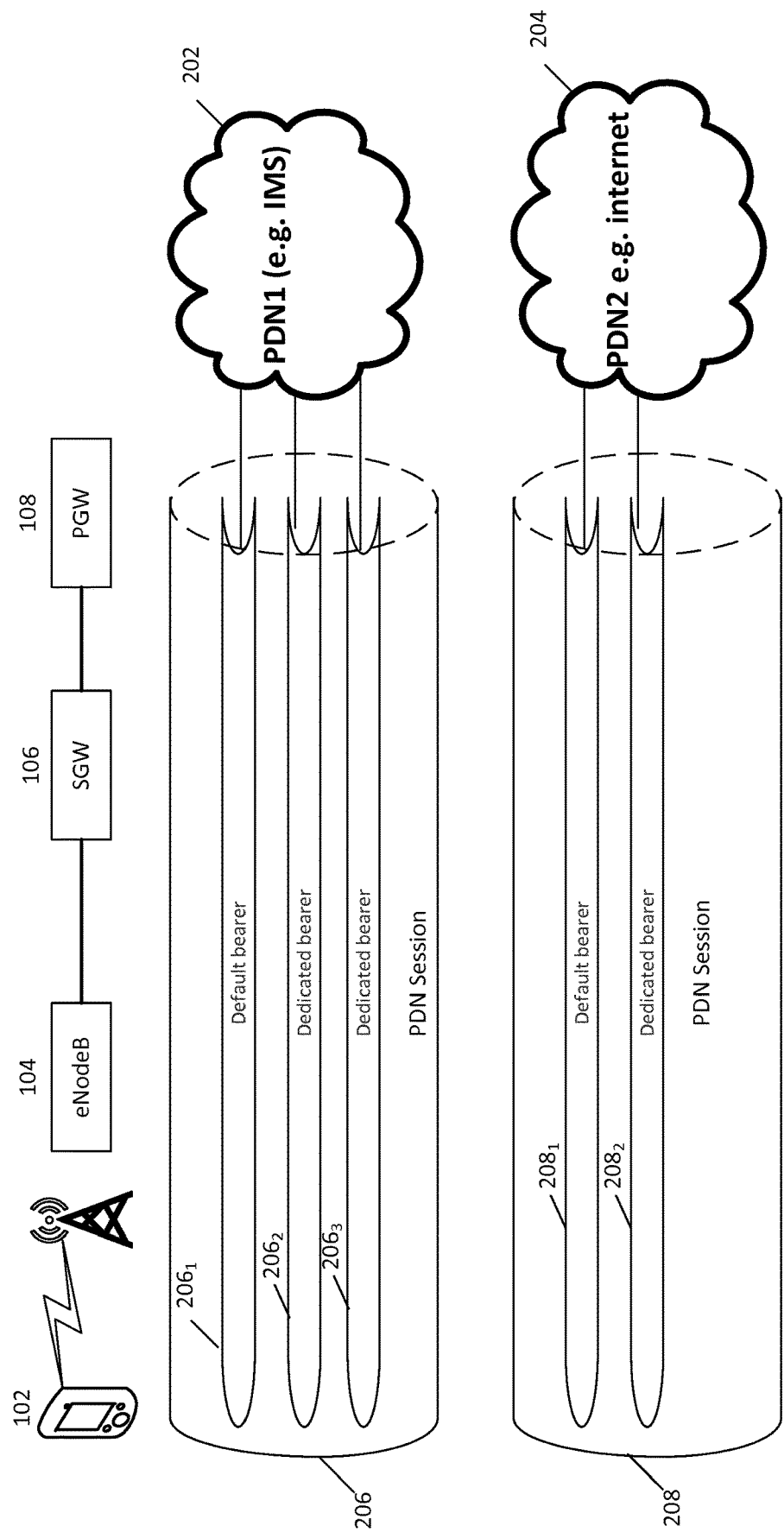
FIG. 2 shows a schematic illustration of EPS bearers within an LTE network.

The eNodeB 304 is an example of a base station and operates to connect the UE to the EPC 306. As described above with reference to FIG. 1, a radio bearer 120 provides a virtual connection between the UE 302 and the eNodeB 304. An S1 bearer provides a virtual connection between the eNodeB 304 and the EPC 306.

The EPC comprises a number of components. In the example shown, these are: a mobility management entity (MME) 310; a serving gateway (SGW) 314; a packet data network gateway (PGW) 318; a policy charging and rules function (PCRF) unit 316 and a home subscriber server (HSS) 312. Each of these components may be referred to herein as nodes. The MME 310 is shown in more detail and comprises a communications interface 320; a predictive dedicated bearer data store 322; a computation unit 324, a communications module 328 and optionally a timer 326.

A brief overview of the components within the EPC 306 will now be described.

The MME 310 operates to process the signaling between the UE 302 and the EPC 306. The MME 310 also operates to select an SGW for a UE during an initial attachment, and to select a PGW.

The SGW 314 is responsible for controlling handovers of the UE 302 to neighboring eNodeBs. The SGW 314 may also retain information on the bearers when a UE is an idle state. It can buffer downlink data while the MME 310 operates to re-establish a bearer. The SGW 314 also functions as a router between the eNodeB 304 and the PGW 318.

The PGW 318 operates to provide connectivity between the UE 302 and the external PDN 308. It is the point of entry to or exit from the LTE network of data packets for the UE 302.

The HSS 312 contains subscription data for users of the network. It may store information about the PDN's a UE can connect to. The HSS may also store the identity of the MME to which the UE is currently attached, or registered.

The PCRF 316 performs policy control and decision making. It can provide QoS authorization for UE's participating in communication sessions and manage data flows in accordance with a user's subscription profile.

Figure 4:
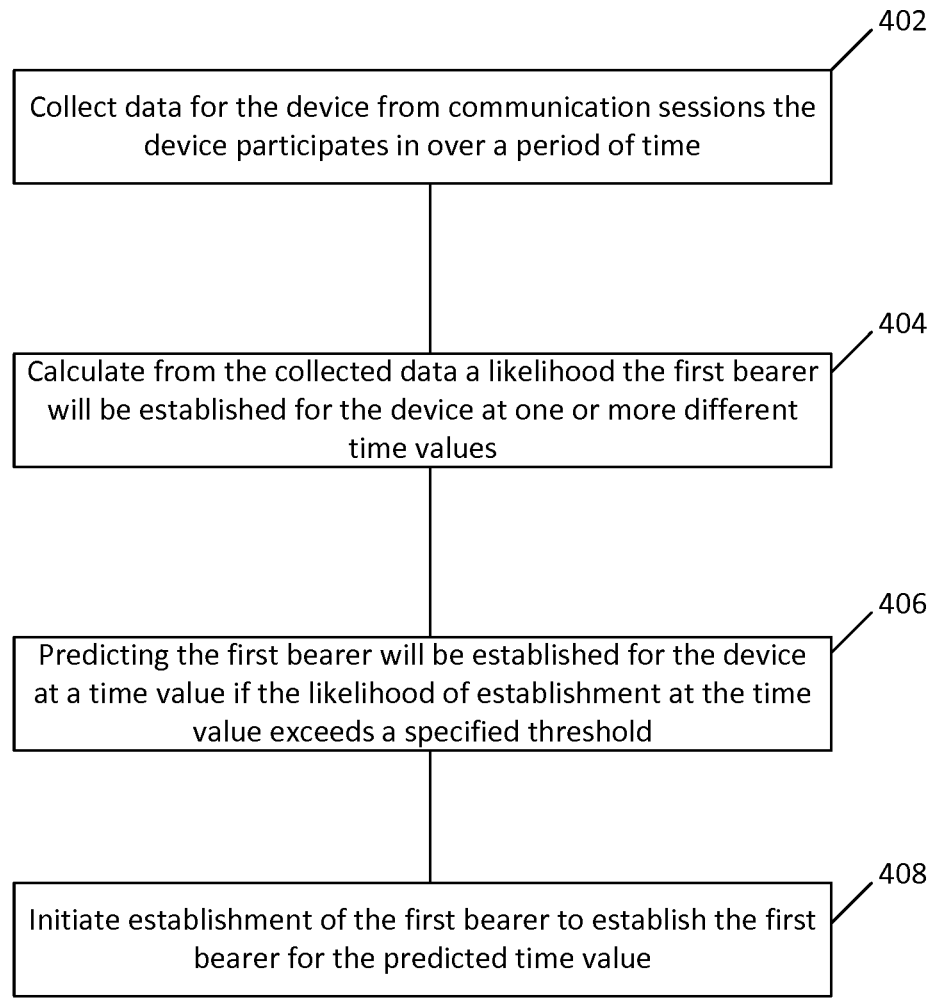
FIG. 4 shows a flowchart of steps for establishing a first bearer using predictive techniques.

The operation of the network nodes to establish a bearer based on a predicted likelihood of use by the UE 302 will now be described with reference to FIG. 4. FIG. 4 outlines a process to establish a first bearer that transports data packets of a second bearer between two nodes of the network 300. Both the first bearer and the second bearer have as their endpoints nodes within the LTE network 300. In accordance with the examples that will now be described, the first bearer is the E-RAB bearer, which transports data packets of the EPS bearer (the 'second bearer') between two nodes of the LTE network (the UE 302 and the SGW 314).

At 402, data from communication sessions the device participates in is collected over a period of time. The data is used to profile the communication sessions the device participates in over the period of time. More specifically, the data may be used to profile requests to establish an E-RAB bearer to support a communication session the device is participating in. In other words, data is collected to profile the establishment of E-RABs used by the device (i.e. established to support a communication session the device is participating in) over a period of time. The device may be said to be participating in a communication session when it is connected to a PDN.

The MME 310 performs 402. The MME 310 may only collect data for certain UE's in the network 300. For example, the MME 310 may collect data only for UE's that have subscribed to a particular service provisioned by the network 300. The MME 310 may identify UEs it is to collect session data for through a flag communicated by the UEs. For clarity, this flag may be referred to herein as a predictive E-RAB (pERAB) flag. Thus, the MME 310 collects session data for UE's tagged by the pERAB flag.

The pERAB may conveniently be provided in a new field of the Attach Request message communicated from the UE to the MME. This message may be a request for attachment to the network 300, as illustrated in FIG. 5.

Figure 5:
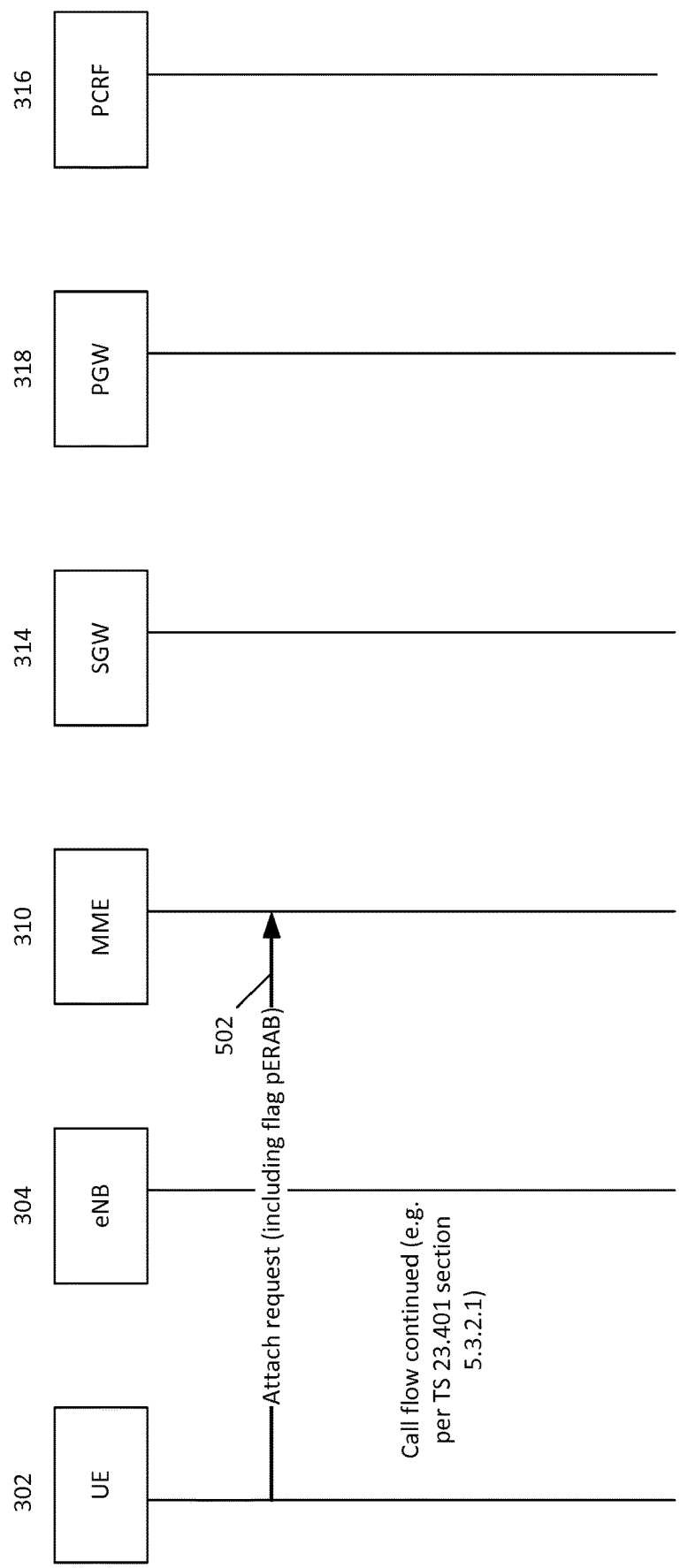
FIG. 5 shows a call flow illustrating an attach request for a UE's attachment to a network.

As shown in FIG. 5, the UE 302 communicates an Attach Request message 502 to the MME to request attachment to the network. The message 502 is modified to include a field for the pERAB flag. Though FIG. 5 shows the attach request being sent directly from the UE 302 to the MME 310, in practice the attach request may be routed from the UE 302 to the MME 310 via the eNodeB 304. Thus, the UE 302 may communicate the Attach Request message (containing the E-RAB flag) to the eNodeB 304. The Attach Request message may further include an identification of the UE 302, such as the International Mobile Subscriber Identity (IMSI). The Attach Request message may include additional information, for example as specified in the 3GPP Technical Specification (TS) 23.401. The eNodeB 304 forwards the Attach Request message to the MME 310. The message may be forwarded to the MME 310 in a control message, or Initial UE message. The remainder of the attach procedure may proceed in its normal fashion, e.g. as outlined in TS 23.401 section 5.3.2.1).

Referring to FIG. 3, the MME 310 may receive the Attach Request message 502 through its communications interface 320. The received message may then be sent to the data store 322. The data store 322 may identify from the received message that the pERAB flag for the UE 302 is set. In other words, the data store 322 may determine from the device identification identifying the UE 302 (e.g. the IMSI) and the set pERAB flag within the Attach Request Message, that session data is to be collected for communication sessions the UE 302 participates in. Thus, the MME 310 collects data for subsequent communication sessions the UE 302 participates in following the initial attachment to the network.

The information collected by the MME 310 for each of the UE's communication sessions could include one or more of: a) identification information for the UE 302 (e.g. the UE's IMSI); b) timing information indicating the time an E-RAB bearer was established to support the communication session the UE 302 was participating in; c) location information indicating: i) the network cell the UE 302 is located in when the communication session was established, or ii) the network cell the UE 302 was located in at the time the E-RAB bearer was established; d) application information identifying the type of application running on the UE 302 the E-RAB bearer is being used for (e.g. the type of network data communicated as part of the session being supported by the E-RAB), such as VoIP, video calling, video streaming, gaming etc.

The timing information may be in the form of a timestamp. The timing information may identify a time of day at which the E-RAB was established. The timing information may optionally additionally identify a day of the week at which the E-RAB was established, and/or the calendar date on which the E-RAB was established. Thus, the 'time' the E-RAB was established may refer to a time of day, or optionally a time of day and day of week, or a time and date.

Thus, the MME 310 may collect, for each communication session the UE 302 participates in over some period of time: the time the E-RAB bearer was established to support the communication session; a location of the network cell the UE 302 was located in at the time the E-RAB was established; and optionally information characterizing the type of application the established E-RAB bearer was used for.

Referring back to FIG. 4, and at 404 the collected data is used to estimate, for one or more different time values, the likelihood an E-RAB will be established to support a communication session for the UE 302 at that time value. The likelihood may take the form of a calculated probability. That is, for one or more different time values (e.g. a time of day; a time of day and day of week, etc.) a likelihood, or probability, that an E-RAB will be established for the UE 302 at that time value is calculated.

The computation unit 324 of the MME 310 (shown in FIG. 3) may perform 404. The computation unit 324 may perform a predictive algorithm to calculate the probabilities the E-RAB will be established at one or more different times.

The estimated likelihoods may be calculated from the data collected for each of the communication sessions the UE 302 participates in over the time period. The computation unit 324 may refine its estimated likelihood each time data additional data is collected for the UE 302, i.e. each time additional data is collected by the data store 322 for a communication session the UE 302 is participating in. In other words, the computation unit 324 may update its estimated likelihood each time data for a new communication session the device participates in is recorded in the data store 322.

Because the chances of an E-RAB being established for the UE 302 at the same time (e.g. to within the same minute) on different days may be relatively low, the computation unit 324 may calculate the likelihood that the E-RAB will be established for the UE 302 within a particular time interval. That time interval could be for example be of the order of minutes, e.g. a 5 minute interval, a 10 minute interval etc. The calculated likelihood for the time interval may then be ascribed to a particular time within that time interval. That time value may conveniently be the beginning of the time interval.

The estimated likelihood an E-RAB will be established for the UE 302 within a specific time interval may be calculated as a function of: i) the number of times an E-RAB was established for the UE 302 within the specific time interval for each day the session information was collected and recorded; and ii) the number of days over which the session information was collected and recorded. As a simple example, if the session information was recorded over a time period of 10 days, and an E-RAB was established for the UE 302 within the time interval between 10:00 am and 10:10 am on 7 of those days, the estimated likelihood an E-RAB will be established for the UE 302 within the time interval between 10:00 am and 10:10 am may be calculated as 0.7, or 70%. The estimated likelihood for the time interval may then be ascribed to the time value defining the beginning of the time interval (in this example, 10:00 am).

It will be appreciated that other, more complex, predictive calculations may be used.

In some examples, the network cell location is not taken into account in the predictive calculations performed by the computation unit 324. That is, the estimated likelihood of E-RAB establishment may be calculated using only the timing information in the data store 322, and excluding the location information. This may be useful for estimating when E-RAB bearers are likely to be established for UE's that use regularly use the same services at similar times for each day, but from different locations.

In other examples, the estimated likelihood an E-RAB will be established may be calculated by the computation unit 324 additionally in dependence on the location of the UE 302 within the network. That is, the calculation unit 324 may use the location information recorded in the data store 322 to estimate: i) the likelihood an E-RAB will be established for the UE 302 at one or more time values; and ii) the network cell that E-RAB will be established in for the UE 302 (i.e., the network cell the device will be located in when that E-RAB is established).

The estimated likelihood an E-RAB will be established may additionally be calculated by the computation unit 324 in dependence on the type of application, or service, running on the UE 302. That is, the computation unit 324 may use the information recorded in the data store 322 to estimate: i) the likelihood an E-RAB will be established for the UE 302 at one or more time values; and ii) the type of application, or service, running on the UE 302 that E-RAB will be established for.

In some examples, the computation unit 324 may estimate: i) the likelihood an E-RAB will be established for the UE 302 at one or more time values; and ii) the network cell that E-RAB will be established in for the UE 302; and iii) the type of application, or service, running on the UE 302 that E-RAB will be established for.

If the estimated likelihood an E-RAB bearer will be established for the UE 302 at a particular time value exceeds a specified threshold, the computation unit 324 may predict that the E-RAB bearer will be established for the UE 302 at that time value (step 406). That time value may be referred to herein as a predicted time value. The computation unit 324 may additionally predict which network cell the E-RAB will be established in, and/or the application or service running on the UE 302 the E-RAB will be established for. That is, the computation unit 324 may predict the network cell the E-RAB will be established in at the predicted time value.

406 may be implemented by decision logic. That is, the computation unit may make a prediction that the E-RAB will be established at a time value if the associated likelihood exceeds the specified threshold, and not make a prediction if the likelihood is below the specified threshold.

The specified threshold may be set by the MME 310. The value of the threshold may depend on the associated time value. For example, a lower threshold may be associated with 'peak' time values (e.g. time values at which the network is expected to be particularly busy). During these time values it may be more important from a performance perspective to have the E-RAB established in time for its use by the UE 302. It may therefore be desirable to lower the threshold to reduce the risk of a bearer not being established for the UE 302 when one was needed. The values of the threshold may alternatively or in addition depend on the associated type of service the E-RAB will be established for. For example, certain types of service (e.g. gaming) are more time-critical than others (e.g. web browsing). It may therefore be preferable to have a lower prediction threshold for the more time-critical services to reduce the risk of a bearer for that service not being established for the UE 302 when one was needed.

Thus, in summary, at 404 the computation unit 324 estimates the likelihood an E-RAB will be established for the UE 302 at one or more time values (and optionally, also the network cell the E-RAB will be established in and/or the service running on the UE 302 the E-RAB will be established for). If any of those estimated likelihoods exceed a specified threshold, then at step 406 the computation unit 324 may predict that an E-RAB will be established at the corresponding time value(s) (and optionally, predict the network cell the E-RAB will be established in and/or the service running on the UE 302 the E-RAB will be established for).

At 408, the MME 310 initiates the establishment of an E-RAB for the UE 302 so that the E-RAB is established by the time value at which the likelihood exceeds the specified threshold (i.e. by the predicted time value). That is, the MME 310 initiates the establishment of the E-RAB at some time prior to the predicted time value so that the E-RAB is established by the predicted time value. The MME 310 may initiate the establishment some specified time period before the predicted time value. This time period may be dependent on the average or typical time taken to establish an E-RAB.

If at 404 the computation unit additionally predicts the network cell the E-RAB will be established in for the UE 302, then at 408 the MME 310 initiates the establishment of the E-RAB in that network cell. That is, the MME 310 initiates the establishment of the E-RAB so it is established at the predicted time value and in the predicted network cell (i.e. the network cell the first bearer is predicted to be established in at the predicted time value). The establishment of the E-RAB is illustrated in FIG. 6.

Figure 6:
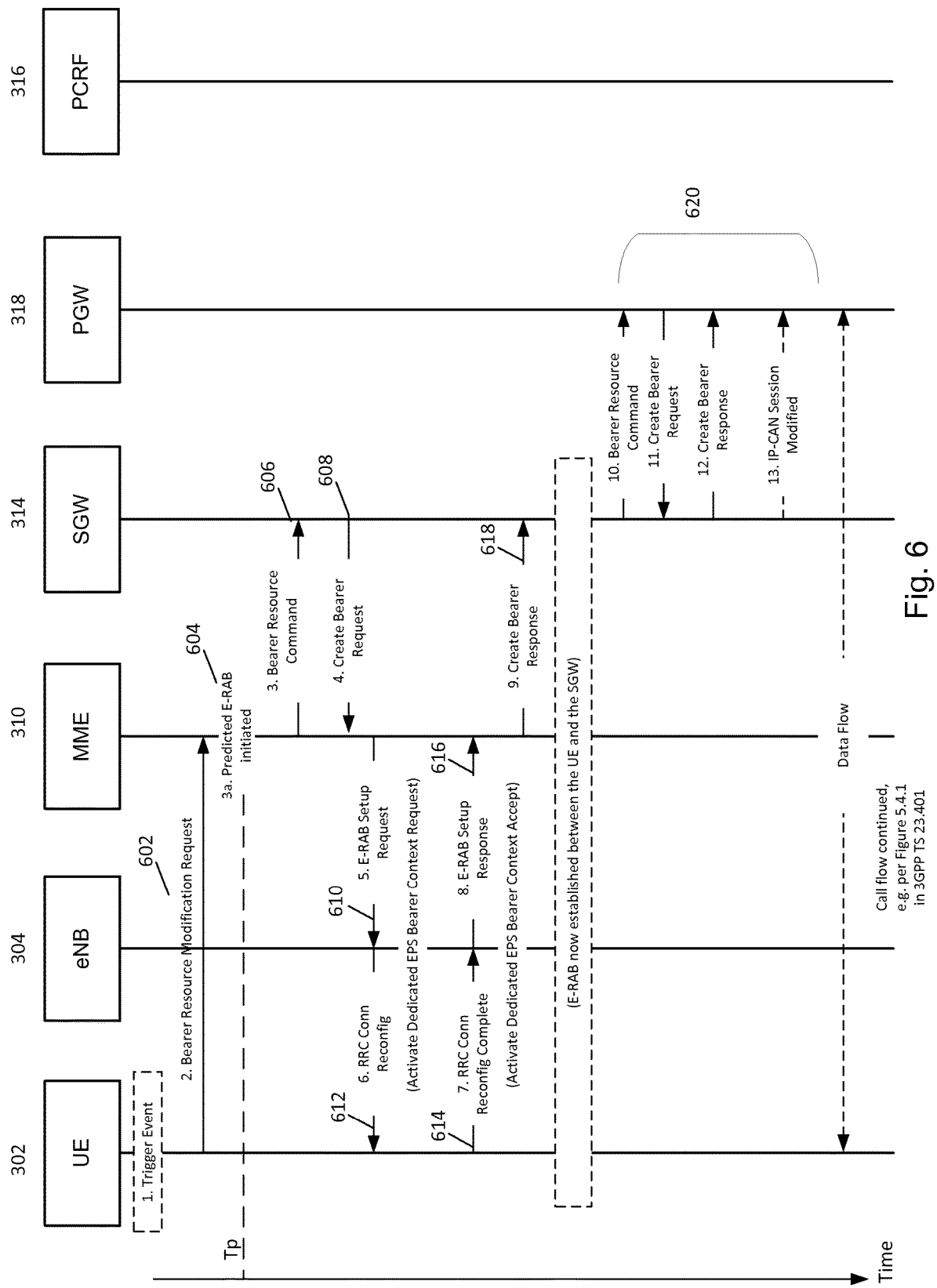
FIG. 6 shows a call flow illustrating the establishment of an E-RAB at a predicted time of use by the UE.

FIG. 6 shows a call flow for UE requested bearer resource modification. Initially, the UE 302 sends a bearer resource modification request 602 to the MME 310. At 3a (block 604), the MME 310 initiates the establishment of an E-RAB at a predicted time value TP. To initiate the establishment of the E-RAB bearer, the MME 310 communicates a bearer resource command message 606 to the SGW 314. This message may be sent by the communications module 328 via the interface 320.

In response to receiving the command 606, the SGW 314 sends a return 'create bearer request' message 608 back to the MME 310. This contrasts with the conventional call flow depicted in 3GPP TS 23.401, where the SGW 314 sends the bearer resource command to the PGW 318. In accordance with the present disclosure, the SGW 314 answers the bearer resource command 606 to establish the E-RAB.

In response to receiving the create bearer request 608 from the SGW 314, the MME 310 communicates an E-RAB setup request message 610 to the eNodeB 304. In response to receiving this message, the eNodeB 304 establishes the radio bearer with the UE 302. This is done through the exchange of RRC reconfiguration messages 612 and 614. Once establishment of the radio bearer is complete, the eNodeB 304 communicates an E-RAB setup response message 616 back to the MME 310. In response, the MME 310 communicates a create bearer response message 618 back to the SGW 314 to complete the establishment of the E-RAB between the UE 302 and the SGW 314.

The call flow may then continue with the exchange of further messages denoted generally at 620 (e.g. as per 3GPP TS 25.401).

The MME 310 may be configured to initiate deactivation of the E-RAB established at step 408 in response to determining that the bearer is not used by the UE 302 within a specified time period tmax of its establishment. This can conveniently free up resources of the network if it is determined the UE 302 is in an idle mode.

The time period tmax may be of the order of minutes. In some examples, tmax=1, 2, 3, 4, 5 or 10 minutes.

To monitor whether to initiate deactivate the established E-RAB, the MME 310 may start timer 326 when the E-RAB is established. If the MME 310 detects that the E-RAB has not been used by the UE 302 upon expiry of the waiting time tmax, it initiates deactivation of the E-RAB. The timer 326 may then be reset.

Figure 7:
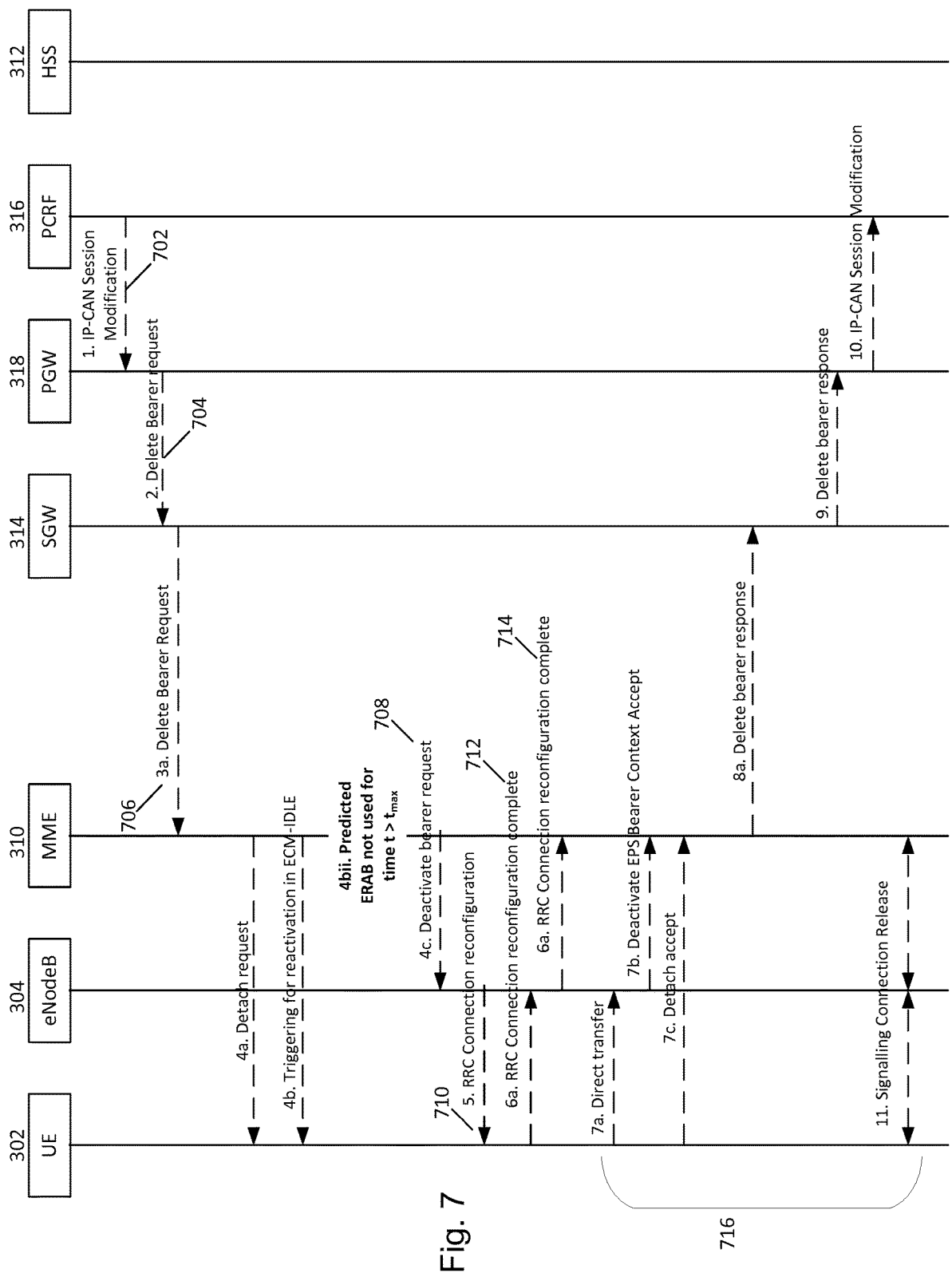
FIG. 7 shows a call flow illustrating the deactivation of the established E-RAB after a specified time period of non-use by the UE.

FIG. 7 is a call flow illustrating the deactivation of the E-RAB established from predictions made at 404 from the session data collected at 402.

FIG. 7 is based on the call flow illustrating PGW-initiated bearer deactivation per 3GPP TS 23.401, but with some modifications which will be explained below.

At 1, the PCRF 316 sends an IP-CAN session modification message 702 to the PGW 318. In response, the PGW 318 sends a 'delete bearer request' message 704 to the SGW 314. At 3a, the MME 310 receives from the SGW 314 a delete bearer request message 706.

Which of 4a-4c are performed by the MME 310 will depend on the reason for deactivating the bearer. 4a is performed when bearer deactivation is neither due to Idle State Signaling Reduction (ISR) deactivation or handover to non-3GPP accesses. 4b is performed if the UE 302 is in an idle state and the reason for releasing the bearer is because of a request for reactivation.

4bii is new and performed by the MME 310 in accordance with the present disclosure. In accordance with this example, the MME 310 determines that the established E-RAB has not been used by the UE 302 within the time period tmax of its predicted time. Thus, the UE 302 may be in an idle state. In response to this determination, the MME 310 sends a deactivate bearer request message 708 to the eNodeB 304 to initiate deactivation of the E-RAB. This message may be sent by the communications module 328 via the interface 320.

In response to receiving message 708, the eNodeB 304 releases the radio bearer through messages 710, 712 and 714. The call flow then continues through the exchange of messages denoted generally at 716 in accordance with 3GPP TS 23.401.

Thus, in summary, the MME 310 communicates a deactivate bearer request message 708 to the eNodeB 304 to initiate deactivation of the established E-RAB in response to determining the E-RAB has not been used by the UE 302 within a maximum time period tmax of its establishment at 406.

The above examples describe an approach for predicting a time at which an E-RAB will be established for a UE 302 (and potentially the network cell it will be established in), and initiating establishment of the E-RAB at that predicted time (and optionally in the predicted network cell). It will be appreciated that the above-described techniques could be equivalently applied to predict a time at which a radio bearer will be established for a UE, and initiating establishment of the radio bearer at that predicted time.

To predict the establishment of a radio bearer, the data store 322 may record data from the communication sessions the UE 302 participates in to profile over a time period requests to establish a radio bearer for the UE 302. In other words, data is collected to profile the establishment of radio bearers used by the UE 302. In this case, the data collected by the MME 310 for each of the UE's communication sessions may include timing information indicating the time the radio bearer was established to support that communication session.

The computation unit 324 may then estimate the likelihood a radio bearer will be established for the UE 302 at one or more different time values, e.g. using any of the techniques described above with reference to 404.

If an estimated likelihood that a radio bearer will be established for the UE 302 exceeds a specified threshold at a particular time value, the MME 310 can initiate establishment of the radio bearer at that time value. The MME 310 may do this by sending a bearer resource command message 606 to the SGW 314 as described above with reference to FIG. 6.

In an analogous fashion to the E-RAB examples described above, the MME 310 may also estimate from the collected data the network cell the radio bearer will be established in for the UE 302, and/or the service running on the UE 302 that radio bearer will be established for. The MME 310 can then initiate establishment of the radio bearer in that estimated network cell.

A further set of examples will now be described for establishing a dedicated EPS bearer using predictive techniques.

Figure 8:
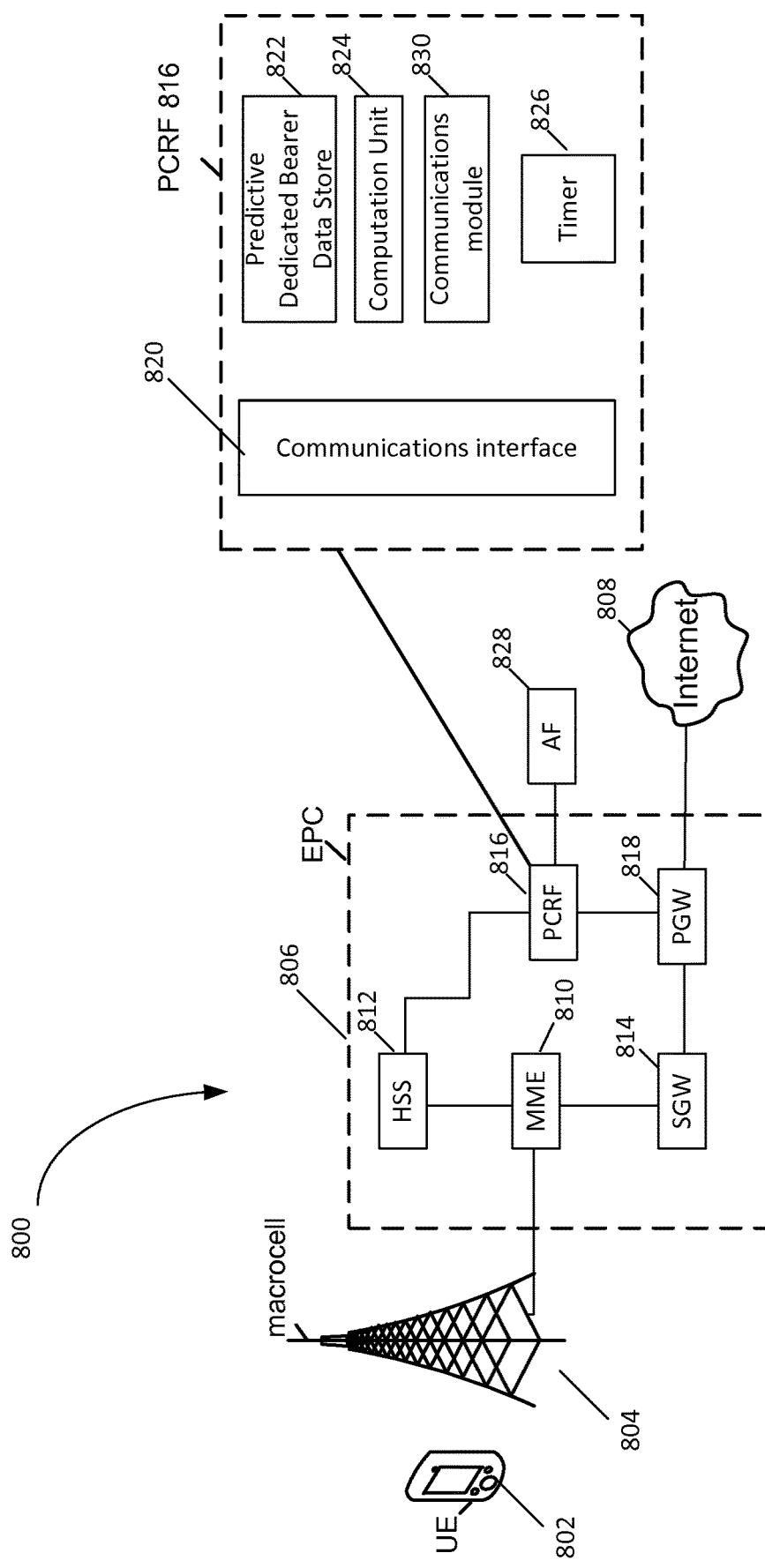
FIG. 8 shows an example LTE network in accordance with another embodiment of the present disclosure.

FIG. 8 shows a further example of an LTE network 800. The network comprises a user equipment (UE) 802, an eNodeB 804, and an evolved network core (EPC) 806. The EPC 806 connects to an external packet data network 808, which in the example illustrated here is the internet. The EPC 806 comprises: a mobility management entity (MME) 810; a serving gateway (SGW) 814; a packet data network gateway (PGW) 818; a policy charging and rules function (PCRF) unit 816 and a home subscriber server (HSS) 812. Also shown is an application function (AF) 828. The AF is a component external to the EPC 806 and operates to provide session and media related information to the PCRF 816.

The components of this network, with the exception of the MME 810 and PCRF 816, operate in the same manner as the corresponding components shown in FIG. 3 and so a description of these components will not be repeated here.

The MME 810 may be a standard MME node (i.e. it may not include the components of the MME 310). The PCRF 816 is shown in more detail and comprises a communications interface 820; a predictive dedicated bearer data store 822; a computation unit 824, a communications module 803 and optionally a timer 826.

Figure 9:
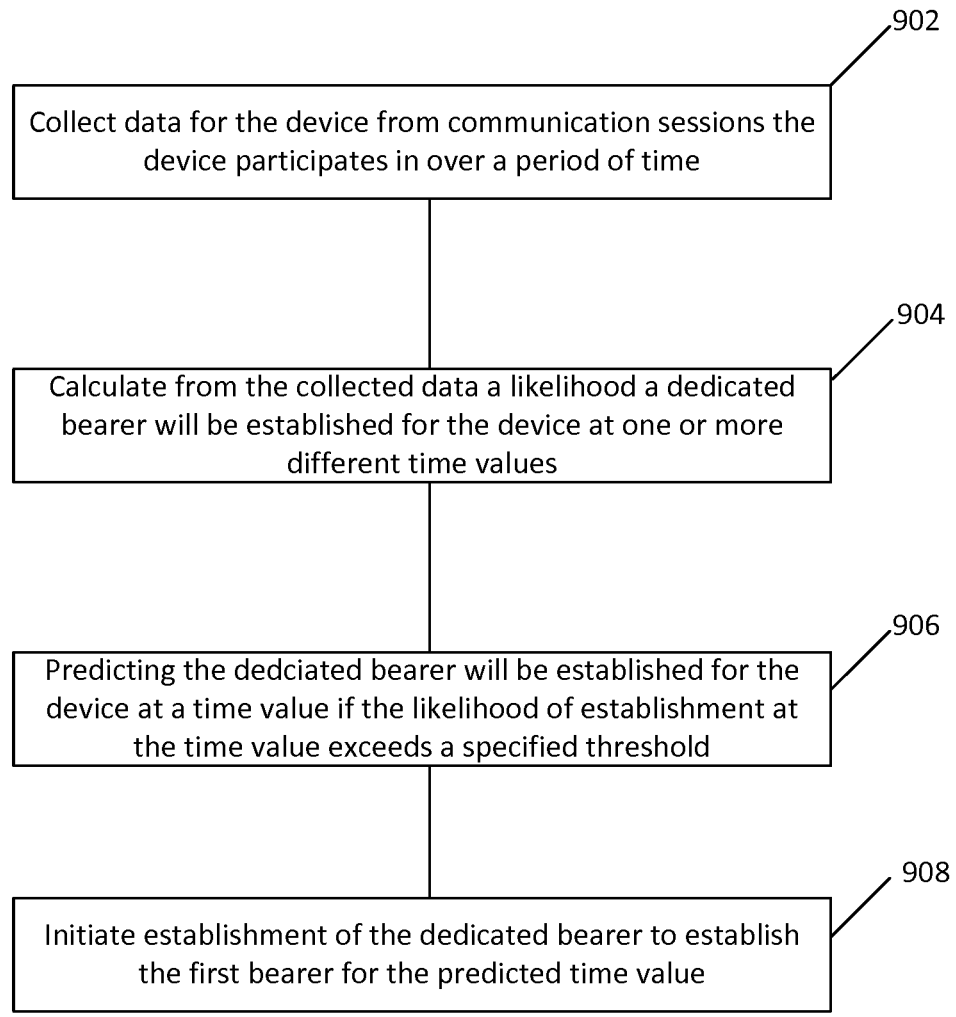
FIG. 9 shows a flowchart of steps for establishing a dedicated bearer using predictive techniques.

The operation of the network nodes to establish a dedicated bearer based on a predicted likelihood of use by the UE 802 will now be described with reference to FIG. 9. FIG. 9 outlines a process to establish a dedicated bearer that transports data packets between two nodes of the network 800. The dedicated bearer has as its endpoints nodes within the LTE network 800. In particular, the dedicated bearer is an EPS bearer that has as its endpoints the UE 802 and PGW 818.

At 902, data from communication sessions the UE 802 participates in is collected over a period of time. The data is used to profile the communication sessions the device 802 participates in over the period of time. More specifically, the data may be used to profile requests to establish a dedicated bearer to support a communication session the UE 802 is participating in. In other words, data is collected to profile the establishment of dedicated bearers used by the device 802 (i.e. established to support a communication session the device is participating in) over a period of time. 902 is performed by the PCRF 816. The PCRF 816 may only collect data for certain UE's in the network 800. For example, the PCRF 816 may collect data only for UE's that have subscribed to a particular service provisioned by the network. The PCRF 816 may identify UE's it is to collect session data for through a flag communicated to the PCRF 816. For clarity, this flag may be referred to as a predictive dedicated bearer (PDB) flag. Thus, the PCRF 816 collects session data for UE's tagged by the PDB flag.

The PDB flag may conveniently be provided in a field of a message received at the PCRF 816 from the AF 828 to modify the session information. This is illustrated in FIG. 10.

Figure 10:
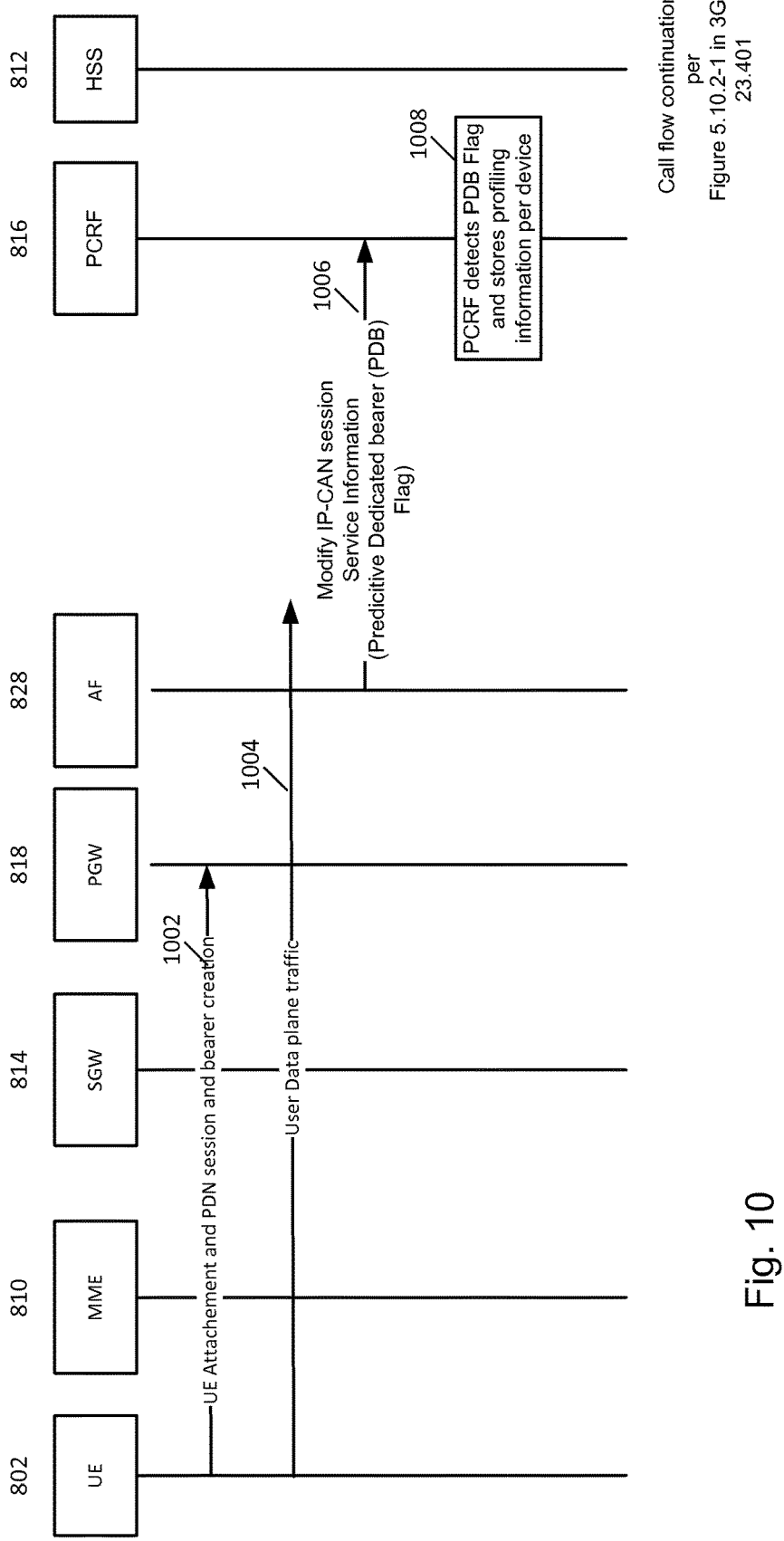
FIG. 10 shows a call flow illustrating the identification of a UE for which session information is to be recorded.

FIG. 10 shows at 1002 the UE 802 requesting attachment to the network and the establishment of a PDN session, including bearer creation. Following creation of the session, user data plane traffic is communicated between the UE 802 and the network, shown at 1004.

The AF sends a modify session information message 1006 to the PCRF 816. This message indicates the PCRF 816 is to store updated, or modified, information for the session the UE 802 is participating in. Included within that message is the PDB flag. Also included within the message 1006 is an identification of the UE 802, such as the International Mobile Subscriber Identity (IMSI).

The PCRF 816 receives the modify session information message 1006 through its communication interface 820. The received message may then be sent to the data store 822. The data store 822 may identify from the received message that the PDB flag for the UE 802 is set. In other words, the data store 822 may determine from the device identification identifying UE 802 (e.g. the IMSI) and the set PDB flag within the modify session information message from the AF 828 that session data is to be collected for communication sessions device 802 participates in. Thus, the PCRF 816 collects data for communication sessions after detecting the PDB flag. This is illustrated in FIG. 10 at block 1008.

The information collected by the PCRF 816 for each of the UE's communication sessions could include one or more of: a) identification information for the UE 802 (e.g. the UE's IMSI); b) timing information indicating the time a dedicated bearer was established to support the communication session the UE 802 was participating in; c) location information indicating: i) the network cell the UE is located in when the communication session was established, or ii) the network cell the UE was located in at the time the dedicated bearer was established; d) application information identifying the type of application running on the UE 802 the dedicated bearer is being used for (e.g. the type of network data communicated as part of the session being supported by the dedicated bearer), such as VoIP, video calling, video streaming, gaming etc.

The timing information may be in the form of a timestamp. The timing information may identify a time of day at which the dedicated bearer was established. The timing information may optionally additionally identify a day of the week at which the dedicated bearer was established, and/or the calendar date on which the dedicated bearer was established. Thus, the 'time' the dedicated bearer was established may refer to a time of day, or optionally a time of day and day of week, or a time and date.

Thus, the PCRF 816 may collect, for each communication session the UE 802 participates in over some period of time:

the time the dedicated bearer was established to support the communication session; a location of the network cell the UE 802 was located in at the time the dedicated bearer was established; and optionally information characterizing the type of application the established dedicated bearer was used for.

Referring back to FIG. 9, and at 904 the collected data is used to calculate, for one or more different time values, the likelihood a dedicated bearer will be established to support a communication session for the UE 802 at that time value. The likelihood may take the form of a calculated probability. That is, for one or more different time values (e.g. a time of day; a time of day and day of week, etc.) a likelihood, or probability, that dedicated bearer will be established for the UE 802 at that time value is calculated.

904 may be performed by the computation unit 824 of the PCRF 816 (shown in FIG. 8). The computation unit 824 may perform a predictive algorithm to calculate the probabilities the dedicated bearer will be established at one or more different times.

The estimated likelihoods may be calculated from the data collected for each of the communication sessions the UE 802 participates in over the time period. The computation unit 824 may refine its estimated likelihood each time data additional data is collected for the UE 802, i.e. each time additional data is collected by the data store 822 for a communication session the UE 802 is participating in. In other words, the computation unit 824 may update its estimated likelihood each time data for a new communication session the device participates in is recorded in the data store.

Because the chances of a dedicated bearer being established for the UE 802 at the same time (e.g. to within the same minute) on different days may be relatively low, the computation unit 824 may calculate the likelihood that the dedicated bearer will be established for the UE 802 within a particular time interval. That time interval could be for example be of the order of minutes, e.g. a 5 minute interval, a 10 minute interval etc. The calculated likelihood for the time interval may then be ascribed to a particular time within that time interval. That time value may conveniently be the beginning of the time interval.

The estimated likelihood a dedicated bearer will be established for the UE 802 within a specific time interval may be calculated as a function of: i) the number of times an dedicated bearer was established for the UE 802 within the specific time interval for each day the session information was collected and recorded; and ii) the number of days over which the session information was collected and recorded. As a simple example, if the session information was recorded over a time period of 10 days, and a dedicated bearer was established for the UE 802 within the time interval between 10:00 am and 10:10 am on 7 of those days, the estimated likelihood a dedicated bearer will be established for the UE 802 within the time interval between 10:00 am and 10:10 am may be calculated as 0.7, or 70%. The estimated likelihood for the time interval may then be ascribed to the time value defining the beginning of the time interval (in this example, 10:00 am).

It will be appreciated that other, more complex, predictive calculations may be used.

In some examples, the network cell location is not taken into account in the predictive calculations performed by the computation unit 824. That is, the estimated likelihood of dedicated bearer establishment may be calculated using only the timing information in the data store 822, and excluding the location information. This may be useful for estimating when dedicated bearers are likely to be established for UE's that use regularly use the same services at similar times for each day, but from different locations.

In other examples, the estimated likelihood a dedicated bearer will be established may be calculated by the computation unit 824 additionally in dependence on the location of the UE 802 within the network. That is, the calculation unit 824 may use the location information recorded in the data store 822 to estimate: i) the likelihood dedicated bearer will be established for the UE 802 at one or more time values; and ii) the network cell that the dedicated bearer will be established in for the UE 802 (i.e. the network cell the device will be located in when that dedicated bearer is established).

The estimated likelihood a dedicated bearer will be established may additionally be calculated by the computation unit 824 in dependence on the type of application, or service, running on the UE 802. That is, the computation unit 824 may use the information recorded in the data store 822 to estimate: i) the likelihood a dedicated bearer will be established for the UE 802 at one or more time values; and ii) the type of application, or service, running on the UE 802 that dedicated bearer will be established for.

In some examples, the computation may estimate: i) the likelihood a dedicated bearer will be established for the UE 802 at one or more time values; and ii) the network cell that dedicated bearer will be established in for the UE 802; and iii) the type of application, or service, running on the UE 802 that dedicated bearer will be established for.

If the estimated likelihood a dedicated bearer will be established for the UE 802 at a particular time value exceeds a specified threshold, the computation unit 824 may predict that the dedicated bearer will be established for the UE 802 at that time value (906). The computation unit 824 may additionally predict which network cell the dedicated bearer will be established in, and/or the application or service running on the UE 802 the dedicated bearer will be established for.

906 may be implemented by decision logic. That is, the computation unit 824 may make a prediction that the dedicated bearer will be established at a time value if the associated likelihood exceeds the specified threshold, and not make a prediction if the likelihood is below the specified threshold.

The specified threshold may be set by the PCRF 816. The value of the threshold may depend on the associated time value. For example, a lower threshold may be associated with 'peak' time values (e.g. time values at which the network is expected to be particularly busy). During these time values it may be more important from a performance perspective to have the dedicated bearer established in time for its use by the UE 802. It may therefore be desirable to lower the threshold to reduce the risk of a bearer not being established for the UE 802 when one was needed. The values of the threshold may alternatively or in addition depend on the associated type of service the dedicated bearer will be established for. For example, certain types of service (e.g. gaming) are more time-critical than others (e.g. web browsing). It may therefore be preferable to have a lower prediction threshold for the more time-critical services to reduce the risk of a bearer for that service not being established for the UE 802 when one was needed.

Thus, in summary, at 904 the computation unit 824 estimates the likelihood a dedicated bearer will be established for the UE 802 at one or more time values (and optionally, also the network cell the dedicated bearer will be established in and/or the service running on the UE 802 the dedicated bearer will be established for). If any of those estimated likelihoods exceed a specified threshold, then at step 906 the computation unit 824 may predict that a dedicated bearer will be established at the corresponding time value(s) (and optionally, predict the network cell the dedicated bearer will be established in and/or the service running on the UE 802 the dedicated bearer will be established for).

At 908, the PCRF 816 initiates the establishment a dedicated bearer for the UE 802 so that the dedicated bearer is established by the time value at which the likelihood exceeds the specified threshold (i.e. by the predicted time value). That is, the PCRF 816 initiates the establishment of the dedicated bearer at some time prior to the predicted time value so that the dedicated bearer is established by the predicted time value. The PCRF 816 may initiate the establishment some specified time period before the predicted time value. This time period may be dependent on the average or typical time taken to establish a dedicated bearer.

If at 904 the computation unit 824 additionally estimates the network cell the dedicated bearer will be established in for the UE 802, then at 406 the PCRF 816 initiates the establishment of the dedicated in that network cell. That is, the PCRF 816 initiates the establishment of the dedicated bearer so it is established the predicted time value and in the predicted network cell. The establishment of the dedicated bearer is illustrated in FIG. 11.

Figure 11:
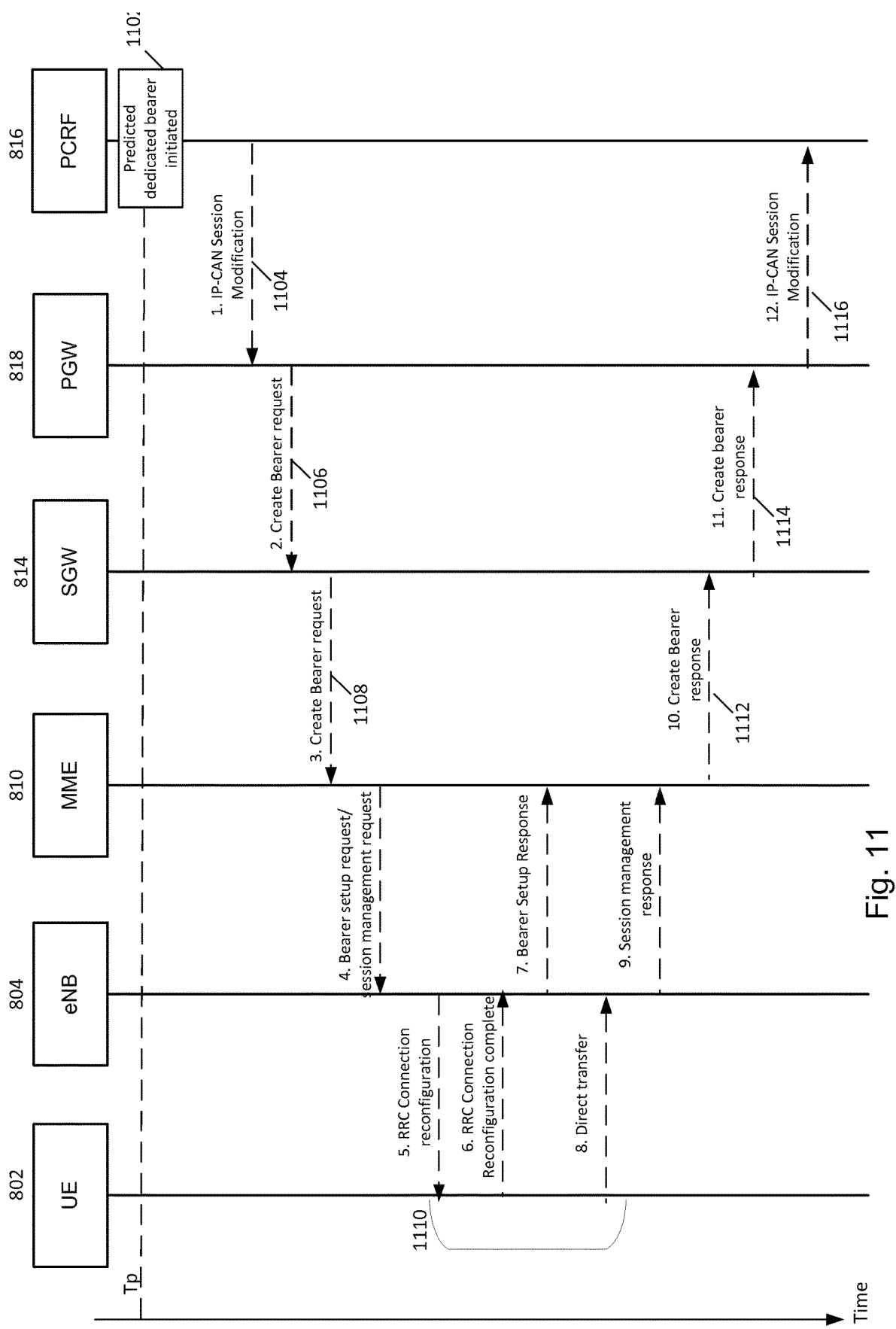
FIG. 11 shows a call flow illustrating the establishment of a dedicated bearer at a predicted time of use by the UE.

FIG. 11 shows a call flow for dedicated bearer activation. The call flow is based on the flow for dedicated bearer activation in 3GPP TS 23.401, but with some modifications explained below.

At block 1102, the PCRF 816 initiates establishment of a dedicated bearer at a predicted time value Tp. This is not included within the conventional call flow for dedicated bearer establishment. To initiate establishment of the dedicated bearer, the PCRF 816 sends a session modification message 1104 to the PGW 818. Message 1104 may be referred to as an IP-CAN Session Modification message, or a QoS policy message. This message may be sent by the communications module 830 via the communications interface 820.

The establishment of the dedicated bearer then follows the remainder of the call flow. A create bearer request message 1106 is communicated from the PGW 818 to the SGW 814, and in response from the SGW 814 to the MME 810 (message 1108). The MME 810 then operates to establish the radio bearer between the UE 802 and eNodeB 804 through the exchange of messages denoted generally at 1110 (4 to 7). The MME 810 then communicates a create bearer response message 1112 from the MME 810 to the SGW 814, and the SGW 814 communicates the create bearer response message 1114 to the PGW 818. In response, the PGW 818 communicates the session modification complete message 1116 to the PCRF 816 to complete establishment of the dedicated bearer. The message 1116 may also be referred to as an IP-CAN Session Modification.

The PCRF 816 may be configured to initiate deactivation of the dedicated bearer established at step 908 in response to determining that the dedicated bearer is not used by the UE 802 within a specified time period tmax of its establishment by the PCRF 816. This can conveniently free up resources of the network if it is determined they are not being used by the UE 802.

The time period tmax may be of the order of minutes. In some examples, tmax=1, 2, 3, 4, 5 or 10 minutes.

To monitor whether to deactivate the established dedicated bearer, the PCRF 816 may start timer 826 when the dedicated bearer is established (e.g. at time Tp). If the PCRF 816 detects that the dedicated bearer has not been used by the UE 802 upon expiry of the waiting time tmax, it initiates deactivation of the dedicated bearer. The timer may then be reset.

Figure 12:
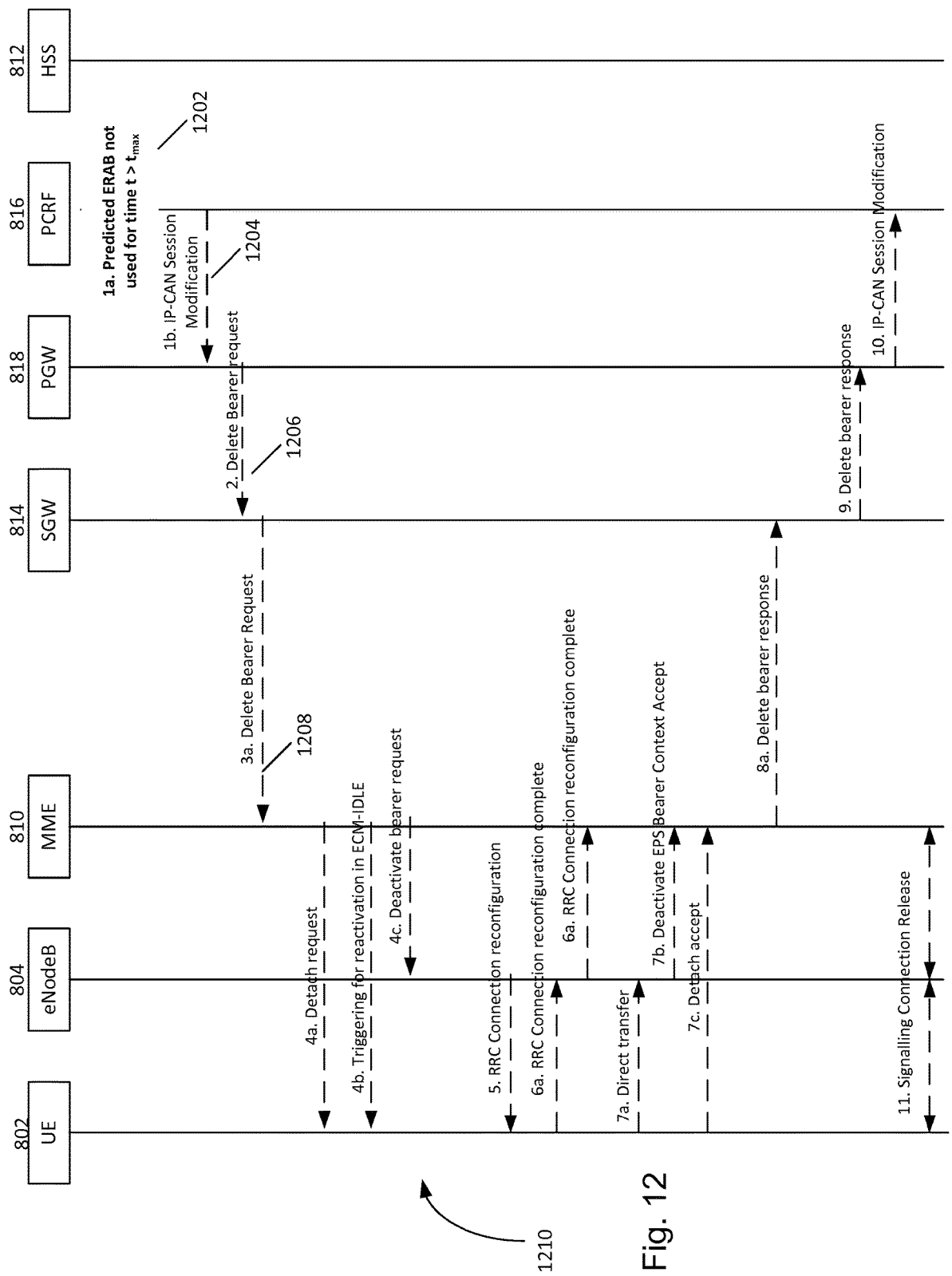
FIG. 12 shows a call flow illustrating the deactivation of the established dedicated bearer after a specified time period of non-use by the UE.

FIG. 12 is a call flow illustrating the deactivation of the dedicated bearer established from predictions made at 904 from the session data collected at 902.

FIG. 12 is based on the call flow illustrating dedicated bearer deactivation per 3GPP TS 23.401, but with some modifications which will be explained below.

1a (denoted at 1202) is a new activity performed by the PCRF 816 in accordance with the present disclosure. In accordance with this example, the PCRF 816 determines that the established dedicated bearer has not been used by the UE 802 within the time period tmax of its predicted time. Thus, the UE 802 may be in an idle state. In response to this determination, the PCRF 816 sends a session modification request message 1204 to the PGW 818. The session modification request message indicates the dedicated bearer is to be deactivated. This message may be sent by the communications module 830 through the interface 820.

Message 1204 causes the PGW 818 to send a delete bearer request message 1206 to the SGW 814, which in turn communicates the delete bearer request message 1208 to the MME 810. The call flow then continues through the exchange of messages denoted generally at 1210 (4 to 11) in accordance with 3GPP TS 23.401.

The above-described examples illustrate techniques for predicting a time when a bearer (e.g. a radio, E-RAB or dedicated EPS bearer) will be used by a UE within a communication network, and initiating the establishment of the bearer so that it can be established at the predicted time (and optionally network cell location). These approaches can enhance the behavior of the network by reducing the delay experienced by the UE waiting for a required bearer to be established. The approaches described herein enable a bearer to be established for when it is needed by the UE using prediction information calculated from recorded session data. The above examples have been described in the context of LTE networks for the purposes of illustration, but it will be appreciated that the techniques herein could equally be applied to other networks implementing bearers.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of establishing bearers for a device in a wireless communication network, comprising:
   collecting data for the device over a period of time from communication sessions the device participates in, at least some of the communication sessions being supported by a default bearer and a dedicated bearer;
   calculating from the collected data a likelihood that establishment of a dedicated bearer will be performed, said establishment being independent of said calculating, for the device at one or more different times values, and predicting the dedicated bearer will be established for the device at a predicted time value if the likelihood of establishment at that predicted time value exceeds a specified threshold; and in response to predicting establishment of the dedicated bearer, subsequently initiating, prior to the predicted time value, establishment of the dedicated bearer so as to have established the dedicated bearer before the predicted time value.

2. The method as claimed in claim 1, further comprising:
receiving at a node of the network a request to modify session information, the request including an identification flag indicating data from communication sessions the device participates in is to be collected for the device, wherein data for the device is collected at the node following receipt of the identification flag.

3. The method as claimed in claim 2, wherein the node is a policy and charging rules function (PCRF) node.

4. The method as claimed in claim 1, wherein the collected data comprises timing data indicating time values in which to initiate establishment of the dedicated bearer for the device.

5. The method as claimed in claim 4, wherein the collected data further comprises location data indicating a network cell of the communication network in which to initiate establishment of the dedicated bearer in for the device.

6. The method as claimed in claim 5, wherein the calculating comprises calculating:
a likelihood the dedicated bearer will be established for the device at one or more different time values, and
the network cell the dedicated bearer will be established in for the device.

7. The method as claimed in claim 6, wherein the initiating comprises initiating establishment of the dedicated bearer:
to establish the dedicated bearer for the predicted time value; and
within the network cell the dedicated bearer is predicted to be established in at the predicted time value.

8. The method as claimed in claim 1, further comprising initiating deactivation of the dedicated bearer if it is determined the device has not used the dedicated bearer within a specified time period of the establishment of the dedicated bearer.

9. The method as claimed in claim 1, wherein the dedicated bearer is an EPS bearer.

10. An apparatus for establishing bearers for a device within a wireless communication network, comprising:
a data store configured to collect data for the device over a period of time from communication sessions the device participates in, at least some of the communication sessions being supported by a default bearer and a dedicated bearer;
a computation module configured to calculate from the collected data a likelihood that establishment of a dedicated bearer will be performed, said establishment being independent of said calculating, for the device at one or more different times values, and predict the dedicated bearer will be established for the device at a predicted time value if the likelihood of establishment at that predicted time value exceeds a specified threshold; and
a communications module configured to subsequently initiate, in response to predicting establishment of the dedicated bearer and prior to the predicted time value, establishment of the dedicated bearer so as to have established the dedicated bearer before the predicted time value.

* * * * *